United States Patent
Joy et al.

(10) Patent No.: US 12,354,024 B2
(45) Date of Patent: Jul. 8, 2025

(54) INTELLIGENT QUESTION ANSWERING ON TABULAR CONTENT

(71) Applicant: ACCENTURE GLOBAL SOLUTIONS LIMITED, Dublin (IE)

(72) Inventors: Eldhose Joy, Thane (IN); Sundar Prasad Jayaraman, Chennai (IN); Harsha Jawagal, Bangalore (IN); Vishal Radhesham Supekar, Pune (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1014 days.

(21) Appl. No.: 16/989,495

(22) Filed: Aug. 10, 2020

(65) Prior Publication Data

US 2022/0044134 A1  Feb. 10, 2022

(51) Int. Cl.
*G06N 5/04* (2023.01)
*G06F 16/334* (2025.01)
*G06N 20/00* (2019.01)

(52) U.S. Cl.
CPC ............. *G06N 5/04* (2013.01); *G06F 16/334* (2019.01); *G06N 20/00* (2019.01)

(58) Field of Classification Search
CPC ......... G06N 20/00; G06N 5/04; G06F 16/334
See application file for complete search history.

(56) References Cited

U.S. PATENT DOCUMENTS

| 2016/0051163 A1* | 2/2016 | Deouell ............... A61B 5/316 600/544 |
| 2018/0157990 A1 | 6/2018 | Allen et al. |
| 2020/0097533 A1 | 3/2020 | Christianson et al. |

OTHER PUBLICATIONS

Pengcheng Yin, Graham Neubig, Wen-tau Yih, & Sebastian Riedel. (2020). TaBERT: Pretraining for Joint Understanding of Textual and Tabular Data. (Year: 2020).*
E. H.-K. Wu, C.-H. Lin, Y.-Y. Ou, C.-Z. Liu, W.-K. Wang and C.-Y. Chao, "Advantages and Constraints of a Hybrid Model K-12 E-Learning Assistant Chatbot," in IEEE Access, vol. 8, pp. 77788-77801, 2020, doi: 10.1109/ACCESS.2020.2988252. (Year: 2020).*
Victor Zhong, Caiming Xiong, & Richard Socher. (2017). Seq2SQL: Generating Structured Queries from Natural Language using Reinforcement Learning. (Year: 2017).*

(Continued)

*Primary Examiner* — Kakali Chaki
*Assistant Examiner* — Johnathan R Germick
(74) *Attorney, Agent, or Firm* — Mannava & Kang, P.C.

(57) ABSTRACT

An intelligent table-based question answering system receives an input user query requesting information from an input table to generate a response to the input query. Two types of user queries including textual user queries and scalar user queries that require at least one mathematical operation to be executed can be processed for answer generation. The input table is processed to generate a paragraph of table text which includes row and column information extracted from the input table. The input query is provided along with the paragraph of table text to a deep Quans model which outputs a candidate answer that forms a textual portion of the response. Also, the candidate answer is reverse mapped to the input table and a portion of the input table including the candidate answer is provided as a tabular portion of the response.

18 Claims, 12 Drawing Sheets

(56) References Cited

OTHER PUBLICATIONS

Jonathan Herzig, Pawel Krzysztof Nowak, Thomas Müller, Francesco Piccinno, & Julian Eisenschlos (2020). TaPas: Weakly Supervised Table Parsing via Pre-training. In Proceedings of the 58th Annual Meeting of the Association for Computational Linguistics. Association for Computational Linguistics. (Year: 2020).*

O. Gambino, A. Augello, A. Caronia, G. Pilato, R. Pirrone and S. Gaglio, "Virtual conversation with a real talking head," 2008 Conference on Human System Interactions, Krakow, Poland, 2008, pp. 263-268, doi: 10.1109/HSI.2008.4581446. (Year: 2008).*

Martin Fowler. "GUI Architectures" Martinfowler.com, https://martinfowler.com/eaaDev/uiArchs.html, Jul. 18, 2006. Accessed Jan. 3, 2024 (Year: 2006).*

Cafarella, M., Halevy, A., Wang, D., Wu, E., & Zhang, Y. (2008). WebTables: Exploring the Power of Tables on the Web. Proc. VLDB Endow., 1(1), 538-549. (Year: 2008).*

Vicky Zayats, Kristina Toutanova, & Mari Ostendorf. (2021). Representations for Question Answering from Documents with Tables and Text. (Year: 2021).*

* cited by examiner

900

| Milestone Name | Milestone | Budget Allocation in | Number of | Setup |
|---|---|---|---|---|
| October 2020 Release | 10-Oct-20 | 10000 | 10 | 2570 |
| January 2021 Release | 1-Jan-21 | 20000 | 15 | 3980 |
| April 2021 Release | 25-Apr-21 | 10000 | 8 | 2350 |
| July 2021 Release | 25-Jul-21 | 8000 | 4 | 2220 |

INTELLIGENT QUESTION ANSWERING ON TABULAR CONTENT

BACKGROUND

Question answering systems can include computer programs that build answers to questions posed by users based on information from a variety of data sources such as structured databases. Alternately, question answering systems may also extract the required information from unstructured data. Question answering research attempts to deal with a wide range of question types related to facts, definitions, how, why, hypothetical, semantically constrained, and cross-lingual questions. The question answering process can be broken down into different parts which can include question processing, passage retrieval, and answer extraction. Question answering systems generally employ textual processing techniques for question processing and for analysis of passages of textual data to and extract relevant portions that enable answering the question.

BRIEF DESCRIPTION OF DRAWINGS

Features of the present disclosure are illustrated by way of examples shown in the following figures. In the following figures, like numerals indicate like elements, in which:

FIG. 9 shows an example table used to respond to user queries in accordance with the examples disclosed herein.

DETAILED DESCRIPTION

Figure 1:
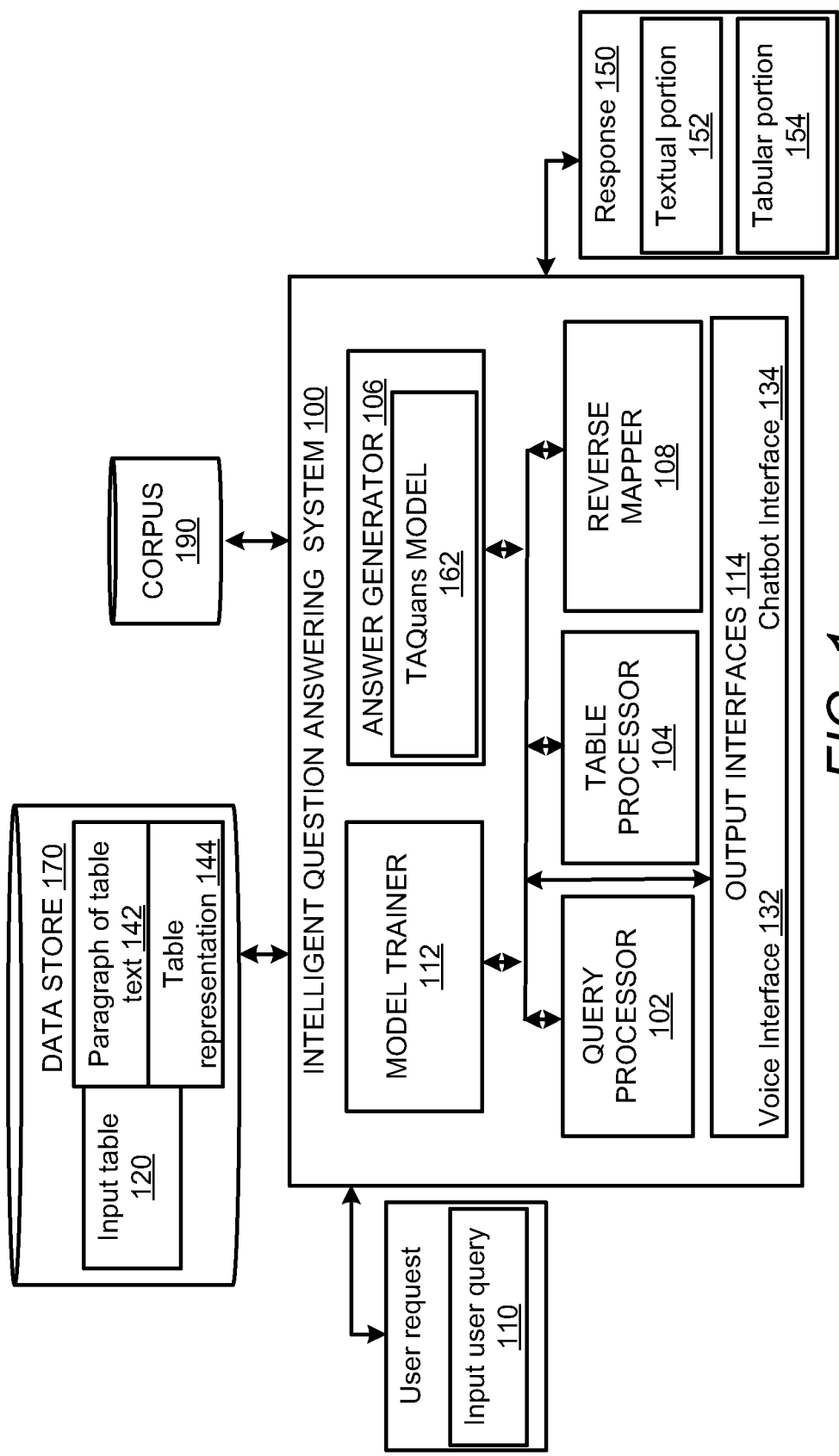
FIG. 1 shows a block diagram of an intelligent table-based question answering system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An intelligent table-based question answering system that receives an input user query along with an input table to be used for responding to the input user query and generates a natural language response to the input user query is disclosed. In an example, the input user query can be framed as a natural language-based question. The input user query is processed to determine if it is a textual query or a scalar query. Input user queries are classified into textual queries or scalar queries based on the contents of the response or the type of operations that are to be executed to generate responses. If the contents of the response to the input user query can be generated via textual manipulations only, then the input user query can be classified as a textual query. If the contents of the response to the input user query require mathematical operations to be performed on or using contents of the input table then the input user query can be classified as a scalar query.

The input user query can be initially processed for the extraction of keywords. The keywords can be used to identify a relevant input table if multiple tables have been provided with the input user query. In an example, the input user query and the multiple tables can be provided in a document. If the input table(s) is provided in a non-editable document, then such a non-editable document can be initially converted into a machine-searchable format so that, the relevant input table can be identified for further processing using the keywords extracted from the input user query. Further processing of the input table can include the extraction of row information and column information. Contents of the cells in the topmost row are identified as column headers, while the contents of the cells in the leftmost column are identified as row headers. The entity associated with the row headers is treated as the primary entity to establish relationships with the corresponding columns.

The row information is further processed into grammatically accurate sentences that form row-level sentences. The row-level sentences are concatenated together to form a paragraph of row information. Similarly, column information is further processed into grammatically accurate sentences that form column-level sentences by combining each of the column headers with the contents of the cells in corresponding columns. The column-level sentences are also concatenated together to form a paragraph of column information. The paragraph of row information and the paragraph of column information are further concatenated together to form a paragraph of table text.

The input user query and the paragraph of the table text are provided to a trained machine reading comprehension (MRC) model. In an example, the MRC model can include a TAQuans model that is trained to identify responses to user queries from tables. The TAQuans model outputs a candidate answer identified from the paragraph of table text. The candidate answer forms a textual portion of the response provided to the user. The response may also include a tabular portion which is generated by reverse mapping the candidate answer to the portion of the table from which it was extracted. The tabular portion will display the portion of the table in addition to the textual portion.

If it is determined that the input user query is a scalar query, the input user query is processed to identify the mathematical or scalar operation that needs to be executed and the data set on which the operation is to be executed. Also, certain features included row_position_ids, column_position_ids, the paragraph of table text, and data_feature are extracted from the input table to be stored as a table representation. The row_position_ids represent the mappings derived from an aggregation of positions spanning across the paragraph of table text and row of the input tables. The column_position_ids represent the mappings derived from an aggregation of positions spanning across the paragraph of the text and the columns of the input table. The data feature accounts for the metadata that describes the contents of the target cell or the row or the column. The features extracted from the input table are provided to the TAQuans model along with the input user query. The TAQuans model extracts relevant features from the input table based on the input query. The scalar operation is executed on the portion of the data set that matches the relevant features. In an example, the scalar or mathematical operation can be executed based on a mathematical formula identified from a collection of predefined mathematical formulae. The output can include the result of the scalar operation on the portion of the data set. The tabular portion is also generated as described above. The response will include a textual portion with the results of the scalar operation presented in grammatically accurate sentences along with the tabular portion. In an example, the responsibility provided via a user interface was used to provide the input user query and the input table to the question answering system. However other interfaces such as voice interfaces may also be employed along with the graphical user interfaces to provide the response.

In an example, the TAQuans model is trained on training data which includes sample tables selected from a large range of topics and sample query-answer pairs. The TAQuans model can be further trained on Stanford Question Answering Dataset (SQuAD) which is a reading comprehension dataset, including questions posed by crowd workers on a set of Wikipedia articles, where the answer to every question is a segment of text, or span, from the corresponding reading passage. With over 100,000 question-answer pairs on more than 500 articles, SQuAD is significantly larger than previous reading comprehension datasets.

The question answering system disclosed herein provides the technical solution to the problem of answering user queries by extracting information from tabular data in response to the user queries. Formatted data presentation structures such as tables, bulleted lists, etc, are generally used to provide precise, quantitative information. A table might include a variety of information from technical specifications of consumer products to financial data, statistics, experimental results, etc. The critical information is therefore formatted as tables rather than as unstructured text, wherein the tabular structure (in addition to the table contents) also conveys information. However, modern natural language processing (NLP) based QA systems are not able to retrieve the information conveyed by the tabular structure. Due to a lack of data relationship understanding and the absence of proper grammatical representation of the information, machine learning (ML) algorithms fail to retrieve the relevant answers to the user queries on the table. As most of the NLP systems are configured to process unstructured text with grammatical parsing and syntax analysis along with composition, they fail to properly process tabular data which presents data differently but lacks the semantic and the grammatical details.

Therefore, the extraction of precise information from tabular data plays a vital role in the field of information retrieval. Considering these challenges, the intelligent table-based question answering system provides an approach to process QA on the tabular information using artificial intelligence (AI) and NLP techniques. Converting the structured tabular data into correct grammatical accurate forms and mapping entity relations enable the question answering system to leverage NLP techniques for processing tabular data and for providing natural-language based responses to user queries. Given the question (i.e., the user query) and the table, the question answering system can be configured to answer the question based on the table. The question answering system can query the table data on the column and row information and at the cell level while purely semantic parsing applications only utilize the generated logical form as an intermediate step in retrieving the answer. Furthermore, the question answering system is also able to map the relationship of the primary entity in the table with the attributes of the entity to get the requested information.

FIG. 1 shows a block diagram of the intelligent table-based question answering system 100 in accordance with the examples disclosed herein. The table-based question answering system 100 receives a user request that includes an input user query 110 including identifying indicia of at least one input table 120, processes information extracted from the input table 120 using a trained TAQuans model 162 to generate a response 150 to the input user query 110. The identifying indicia can include data that enables the question answering system 100 to identify the input table 120 via indexing techniques. The response 150 can be conveyed via one or more of the various output interfaces 114 that can be employed by the question answering system 100 for I/O operations. The question answering system 100 also includes a query processor 102, a table processor 104, an answer generator 106 which includes the TAQuans model 162, a reverse mapper 108, and a model trainer 112. The question answering system 100 may be coupled to a corpus 190 that includes sample user queries, sample tables associated with the user queries, and table representations generated in accordance with the examples disclosed herein. The corpus 190 is used to train the TAQuans model 162 which is then used to generate responses to user queries.

The question answering system 100 can be configured to process various kinds of tables which can include but are not limited to:

Tables with Name Value Pairs

Tables with Headers and First column as Primary Entity

Tables with Columns as the Information points—Subset of the table cell

Tables starting with a serial no. (The first column includes integers)

Tables with Column information as Date-Time, Currency, Names of Person, Location Tables with Long bulleted points as answers Tables across Pages in a document Below are some table examples that can be processed by the question answering system 100 in accordance with the examples disclosed herein. It can be appreciated that the below tables are provided for illustration purposes only and that other types of tables can also be similarly processed by the question answering system 100.

Tables with Name Value Pair

TABLE 1

| | |
|---|---|
| Project Name: | ABC |
| Project Business Unit/Functions: | Plant A |
| | Plant B |
| | Plant C |
| Project Phases Covered by Work Order: | Design, Build and Test |
| Local Jurisdiction | Turkey, France, Netherlands |
| Language Support | English |

Tables with Headers and First Column as Primary Entity

TABLE 2

| Scope element | Scope description | Assumptions |
|---|---|---|
| Data Scope | Listing of all master and transactional data in the scope of scheduled work. | Data scope is not finalized yet however attached document has been updated with Data scope based on assumptions. 10 Conversion objects assumed in scope. Further details in the attached document |
| Language Scope | Listing of all languages, including translation services, required to deliver the scope of scheduled work. | English and Turkish |
| Geographic Delivery Scope | Listing of all geographic locations included within the scope of scheduled work. | Turkey, France |

Tables with Column Information as Date-Time, Currency

TABLE 3

| No. | Risk Description | Mitigation | Owner |
|---|---|---|---|
| 1 | The scope of middleware and integration efforts for all new interfaces in scope need to be aligned and managed or it may result in impacts to the timeline. | Project to get a proper timeline per interface with the Middleware team. | Project |
| 2 | Scope of work resulting from system might impact timelines, if not identified early. | Project to finalize project scope no later than Mar. 31, 2019 by communicating the timelines to the Middleware team and aligning on the same. | Project |

Tables with Column Information as Names of Person

TABLE 4

| Role | Name | Position |
|---|---|---|
| Client Work Order Manager | XYZ | Onsite Delivery Lead |
| Service Provider Work Order | ABC | Offshore Delivery Lead |

The input user query 110 can be received as a textual input provided to a textual interface, a graphical user interface (GUI), or even a voice interface, etc. If provided to a voice interface, the input user query 110 can be transformed into a textual format and provided to the query processor 102 which parses, tokenizes, and extracts keywords from the input user query 110. The extracted keywords can be employed to identify relevant information from the input table 120. In an example, the input user query 110 can be analyzed to determine if it is a scalar query that requires scalar operations that include mathematical operations with numerical data. If it is a scalar query, then the query processor 102 further processes the input user query 110 to extract the scalar operation to be executed and a dataset on which the operation is to be executed. The input table 120 is processed by the table processor 104. In an example, the input table 120 can be accessed from a document such as a word processing document (e.g., .doc), a portable document format (.pdf), or even as a scanned image which can include the document in a non-editable format. If the document is received as a scanned image, the table processor 104 may initially execute conversion processes such as optical character recognition (OCR) to extract the table information. In an example, the document may include multiple tables. The extracted keywords from the input user query 110 can be used to identify one or more relevant tables such as the input table 120 with the relevant information from the multiple tables in the document. The table processor 104 further extracts row information, column information from the input table 120. The row information can include the row headers which would include contents in the leftmost column. If the contents in the leftmost column include serial numbers then the contents of the penultimate column i.e., the second column from the left will be selected as row headers. In an example, the row headers can be treated as the primary entity to establish relations with the column data. Similarly, contents of the first row or the topmost row can be identified as column headers. Besides, the contents of the table cells can be extracted and combined with the corresponding row headers and column headers to build row-wise and column-wise relationships. The table processor 104 further combines the row information and the column information to form a paragraph of table text 142 which includes grammatically accurate sentences formed of the row information and the column information. Furthermore, the table processor 104 may also generate a table representation 144 if the input user query 110 involves mathematical operations as detailed herein.

The input user query 110, the paragraph of table text 142, and optionally, the table representation 144 are provided to the answer generator 106 which includes the TAQuans model 162 model trained to generate a response 150. The TAQuans model 162 parses the user query 110 to retrieve one or more candidate answers from the paragraph of table text 142. The candidate answers can be ranked and the topmost candidate answer is selected. The selected candidate answer can be framed into grammatically accurate sentence(s) to form a textual portion 152 of the response 150. The paragraph of table text 142 along with the table representation 144 and the textual portion 152 of the response 150 are provided to a reverse mapper 108. The reverse mapper 108 can use the textual portion 152 and the table representation 144 to reverse map the relevant information from the textual portion 152 to the input table 120 to highlight the contents of the table cells that form the relevant information. Accordingly, the response 150 includes a tabular portion 154 in addition to the textual portion 152. The tabular portion 154 includes portions of the input table 120 from which the relevant information was extracted by the question answering system 100.

The response 150 thus generated can be provided to the user via one or more of the output interfaces 114. In an example, the same interface that was employed by the user to provide the input user query 110 to the question answering system 100 may be employed by the question answering system 100 to provide the output. For example, if the user employs a voice interface 132 to provide the input user query 110 which may include the identifying indicia of the input table 120, then the question answering system 100 may also provide a response via one or more of the voice interface 132 and the chatbot interface 134. More particularly, the textual portion 152 may be provided via one or more of the voice interface 132 and the chatbot interface 134 while the tabular portion 154 is provided on the chatbot interface 134. When providing the response 150 via the chatbot interface 134 or other GUI, the response 150 can be framed into a hypertext markup language (HTML) or JavaScript notation object (JSON).

The model trainer 112 accesses a corpus 190 of sample user queries, the corresponding sample tables associated with the sample user queries, and sample table representations that are used to train the TAQuans model 162. More particularly, the TAQuans model 162 is trained on the sample representations derived from the sample tables along with handcrafted sample user queries and the SQUAD dataset. The TAQuans model 162 is therefore better trained to learn the query level feature extraction from the table representations.

Figure 2:
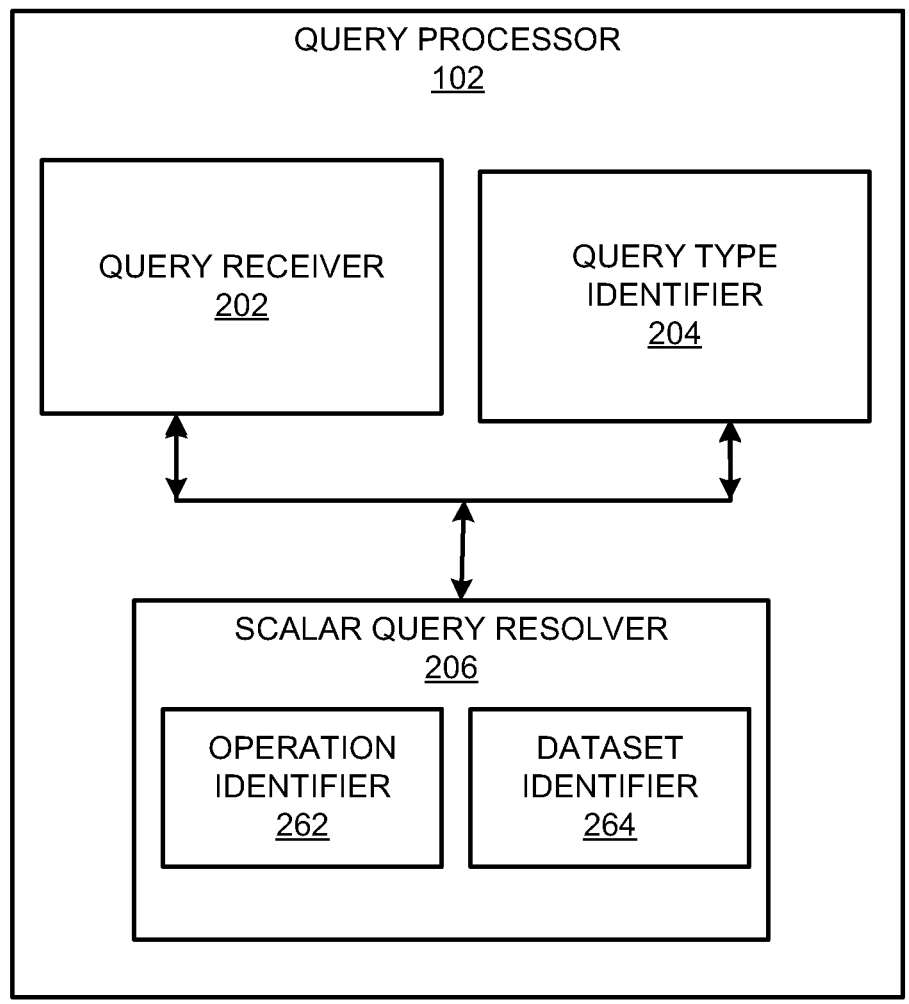
FIG. 2 shows a block diagram of a query processor in accordance with the examples disclosed herein.

FIG. 2 shows a block diagram of the query processor 102 in accordance with the examples disclosed herein. The query processor 102 includes a query receiver 202, a query type identifier 204, and a scalar query resolver 206. The query preprocessor 202 accesses the user request to extract the input user query 110 for parsing, tokenizing, extracting the keywords from the tokens, and determining the data types of the tokens. Based on one or more of the keywords and the data types of the tokens, it is determined by the query type identifier 204 if the input user query 110 is a textual user query which requires a textual response only or if the input user query 110 is a scalar user query that also requires a scalar operation or a mathematical operation to be executed to generate the response 150. In an example, the query type identifier 204 can employ string matching techniques or even trained classifiers to identify the keywords and the token data types. If the keywords match words that pertain to any of the predetermine scalar operations or their synonyms such as sum, total, average, the total number of, etc., then the input user query 110 can be classified as a scalar user query. Similarly, if the input user query 110 includes numerical data types with keywords such as less than, greater than, equal to or keywords pertaining to other mathematical symbols, then the query can be classified as a scalar query. If the input user query 110 does not include any of the keywords pertaining to mathematical operators or does not include any numerical data types, then the input user query 110 can be classified as a textual query. If it is determined that the input user query 110 is a textual query, then the input user query 110 is transmitted to the answer generator 106 for the generation of the response 150.

If it is determined that the input user query 110 is a scalar query, then the scalar query resolver 206 further processes the input user query 110 to identify the scalar operation and a dataset or contents of specific cells within the input table 120 on which the scalar operation is to be executed in order to generate the response 150. The scalar query resolver 206 includes an operation identifier 262, and a dataset identifier 264. The operation identifier 262 within the scalar query resolver 206 processes the scalar query to identify a scalar operation to be performed. A scalar operation can include one or more mathematical operations, aggregating operations, comparison operations, or other manipulations that can be performed on numerical values. The scalar operation can be detected based on specific keywords (or their synonyms) that may be included in the input user query 110. In an example, the operation identifier 262 may be coupled to a dictionary that enables identifying terms or keywords that signify that a scalar operation needs to be conducted. The dataset identifier 264 is configured to identify portions of datasets on which the scalar operation is to be conducted. For example, a user query for a total price can be analyzed by the scalar query resolver 206 so that the operation is identified from the word 'total' as a 'sum' function and the dataset is identified as a table column 'price'.

Figure 3:
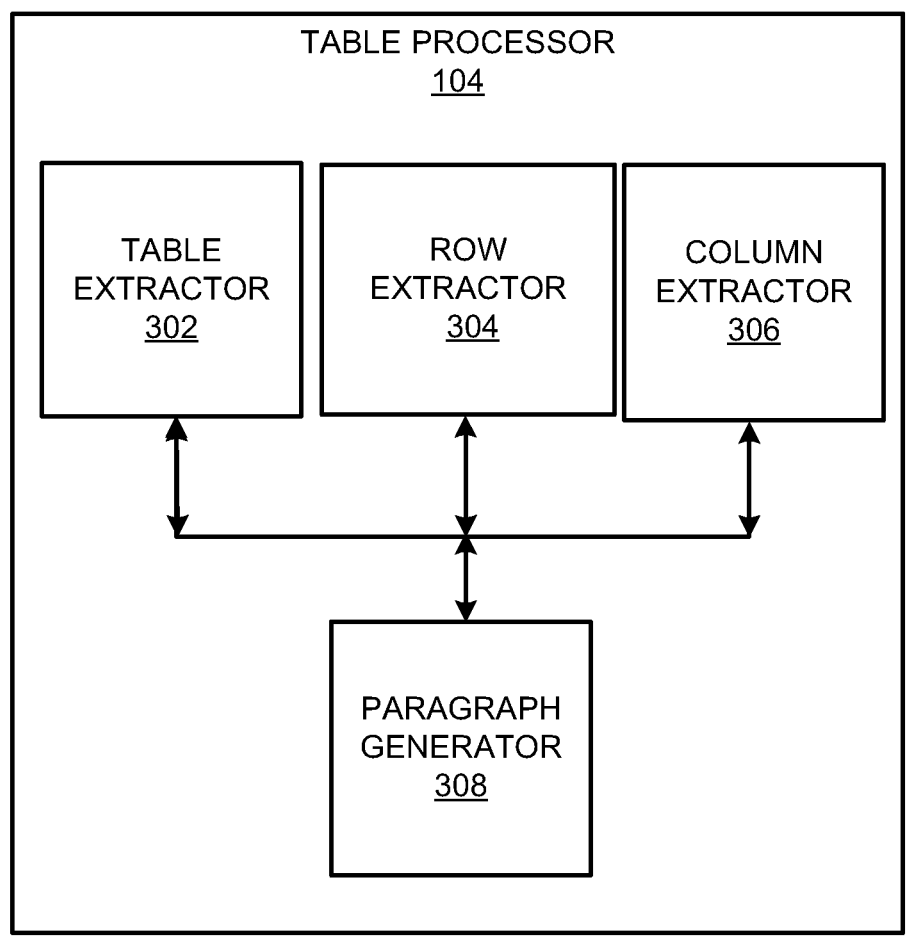
FIG. 3 is a block diagram of a table processor in accordance with the examples disclosed herein.

FIG. 3 is a block diagram of the table processor 104 in accordance with the examples disclosed herein. The table processor 104 includes a table extractor 302, a row extractor 304, a column extractor 306, and a paragraph generator 308. The document including the input table 120 is provided to the table extractor 302 to extract the tables included in the document. Tables can be extracted from the documents using tools such as but not limited to Camelot-py and PyDFT2 python libraries. Upon extracting the input table 120 from the document, the row and column information can be extracted using custom functions. More particularly, the row extractor 304 can be configured using machine learning (ML) tools such as classifiers to identify and extract the column headers of the input table 120. The column headers would include contents of cells of the first row or the topmost row in the input table 120. Similarly, the ML tools can be employed for extracting the contents of cells in the first column or the leftmost column which is treated as the primary entity to establish the relations with the column data. If the first column includes serial numbers, then the first column and the corresponding column header may be discarded from consideration and the next column is selected. Similarly, the column extractor 306 identifies and extracts columns and column headers.

The information extracted by the row extractor 304 and the column extractor 306 is provided to the paragraph generator 308 which employs natural language generation (NLG) tools to generate the paragraph of table text 142 which can include grammatically accurate row-level and column-level sentences. Based on the information from the row extractor 304, the paragraph generator 308 can generate the row-level sentences. Similarly, the paragraph generator 308 generates the column-level sentences based on the input from the column extractor 306. For each row, the primary entity is combined with the corresponding column header to form a row-level sentence. The row-level sentences thus formed are combined to generate a paragraph of row information for the input table 120. Similarly, for each column, the column header is combined with the column text to form a column-level sentence. In addition, each column can be processed to form sentences that can include bulleted points. The column-level sentences including those in the form of bulleted points can be combined to generate a paragraph of column information by concatenating the column-level sentences. The input table 120 is thus processed and the resulting paragraphs from the row-level sentences and the column level sentences can be concatenated to form the paragraph of table text 142. In an example, the paragraph of table text 142 can be generated in JSON format which can be provided to the TAQuans model 162 for response generation.

A sample paragraph of table text that may be generated by the paragraph generator 308 for Table 2 is shown below:
Sample Text from Table Parsing for Row Data:
For Data Scope has Scope description as 'Listing of all master and transactional data in the scope of scheduled work' and Assumptions as 'Data scope is not finalized yet however attached document has been updated with Data scope based on assumptions. 10 Conversion objects assumed in scope. Further details in the attached document.'. For Language Scope has Scope description as 'Listing of all languages, including translation services, required to deliver the scope of scheduled work.' and Assumptions as 'English and Turkish'.

Sample Text from Table Parsing for Column Data:

Following are the Scope elements '1. Data Scope 2. Language Scope 3. Geographic Delivery Scope.'

Figure 4:
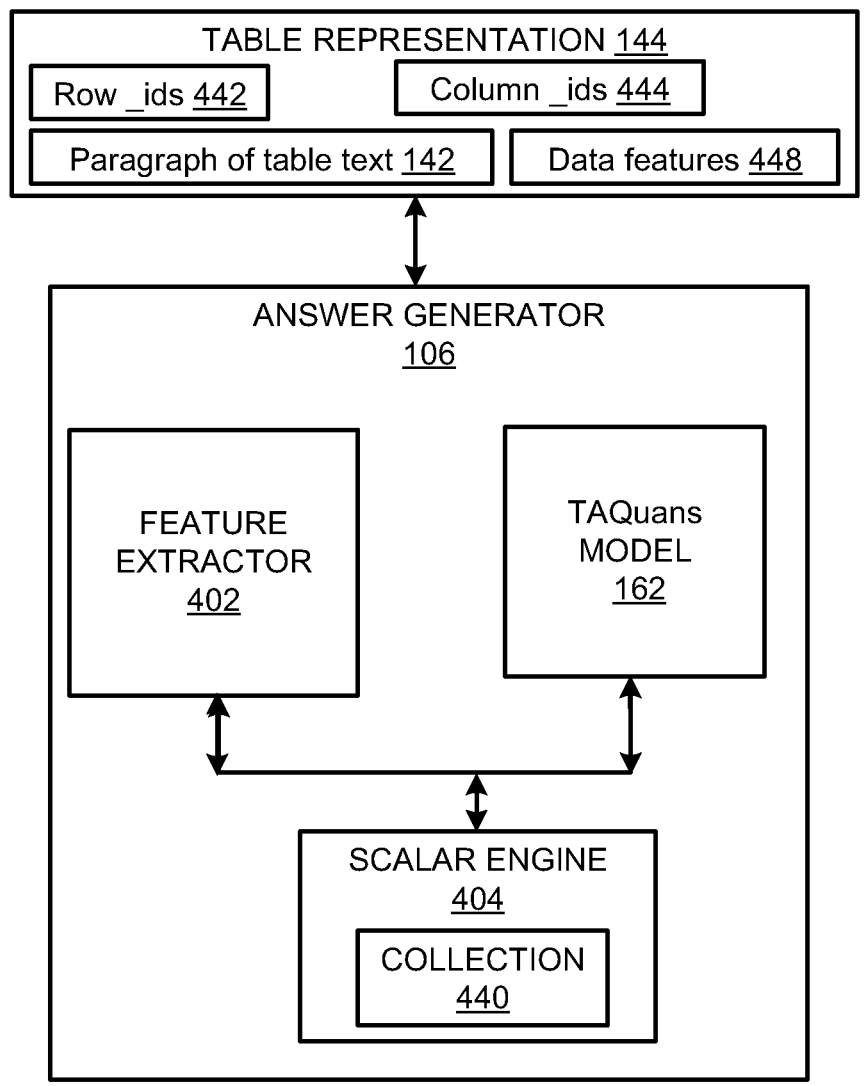
FIG. 4 shows a block diagram of an answer generator in accordance with the examples disclosed herein.

FIG. 4 shows a block diagram of the answer generator 106 in accordance with the examples disclosed herein. In addition to the TAQuans model 162, the answer generator 106 also includes a feature extractor 402 and a scalar engine 404 to process scalar queries. The answer generator 106 receives the paragraph of table text 142 and the input user query 110 and generates a candidate answer or the textual portion 152 of the response 150. If the input user query 110 is determined to be a textual query, the input user query 110, along with the paragraph of table text 142 is passed on to the TAQuans model 162. The TAQuans model 162 extracts a candidate answer to the input user query from the paragraph of table text 142 to form the textual portion 152 of the response 150.

If the input user query 110 is a scalar query, the feature extractor 402 accesses the input table 120 to extract various features including but not limited to, row_position_ids 442, column_position_ids 444, generated text or paragraph of table text 142 and data_features 448. The various features that are extracted are stored as table representation 144. The row_position_ids 442 represents the mapping derived from an aggregation of positions spanning across the generated text and rows of the input table 120. The column_position_ids 444 represents the mapping derived from an aggregation of positions spanning across the generated text and the columns of the parsed input table. The paragraph of table text 142 represents a natural language text derived as an aggregation of the row and column level representation of the parsed input table. The data_features 448 account for the metadata that best describes the contents of corresponding target cells or rows or columns in the context.

In an example, the TAQuans model 162 can be based on Deep Quans which is a variation of the Bidirectional Encoder Representations from Transformers (BERT). BERT is designed to pre-train deep bidirectional representations from an unlabeled text by jointly conditioning on both the left and right content in all layers. Deep Quans is a multi-layer bidirectional Transformer encoder. The output of the encoders is attached to a task-specific layer/neural network to train the complete neural network. The TAQuans model 162 can be trained to extract the relevant features from the table representation 144 of the input table 120 based on the input user query 110. The features extracted from the input table 120 serve as the ground truth for the extraction of rows, columns, or cells from the input table 120. The TAQuans model 162 is jointly trained on a set of questions along with the data representations that are generated from the input table 120 to enable question answering. The probabilities are modeled using a SoftMax function.

When the input user query 110 is a scalar query, the relevant features extracted from the table representation 144 based on the input user query 110 are transmitted to the scalar engine 404 which applies the identified operation on the set of mapped features on a successful data feature map to generate a response to the scalar query. The scalar engine 404 includes a collection of a set of predefined mathematical operations 440 or mathematical formulae that may be used with the table data. By way of illustration and not limitation, the collection 440 can include the operations count, sun, and average. Other functions can also be included based on the tasks to be handled by the question answering system 100. The following are some example operations supported by the collections:

1. Count $$\text{Count} = \sum_{f=0}^{n} N = \begin{cases} N = feature_f, \text{ type}(feature_f) = \text{data\_feature} \\ N = 1, \text{ type}(feature_f) \neq data_{feature} \end{cases} \quad \text{Eq. (1)}$$

The count function is derived, to count the occurrences of the extracted features for non-numerical data feature whereas, to sum up for numerical data feature. The count function has been designed to execute on numerical and non-numerical functions.

2. Sum $$\text{Sum} = \sum_{f=o}^{n} N = \begin{cases} N = feature_f, \text{ type}(feature_f) = \text{data\_feature} \\ N = 1, \text{ type}(feature_f) \neq data_{feature} \end{cases} \quad \text{Eq. (2)}$$

The sum function is derived, to add up all only the numerical data features extracted from the TAQuans model 162 neglecting the non-numerical features.

3. Average $$\text{Average} = \frac{\sum_{f=o}^{n} N = \begin{cases} N = feature_f, \text{ type}(feature_f) = \text{data\_feature} \\ N = 0, \text{ type}(feature_f) \neq data_{feature} \end{cases}}{\sum_{f=0}^{n} N = \begin{cases} N = feature_f, \text{ type}(feature_f) = \text{data\_feature} \\ N = 1, \text{ type}(feature_f) \neq data_{feature} \end{cases}} \quad \text{Eq. (3)}$$

Figure 5:
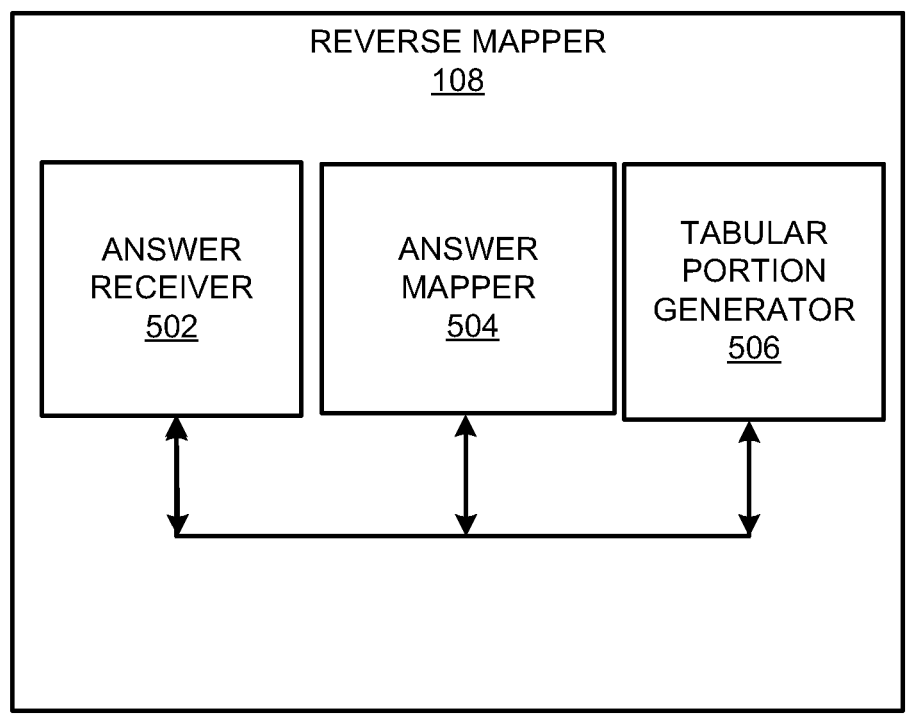
FIG. 5 shows a block diagram of a reverse mapper in accordance with the examples disclosed herein.

FIG. 5 shows a block diagram of the reverse mapper 108 in accordance with the examples disclosed herein. The reverse mapper 108 includes an answer receiver 502, an answer mapper 504, and a tabular portion generator 506. The answer or the textual portion 152 of the response 150 generated by the answer generator 106 is obtained by the answer receiver 502. In addition, the output of the TAQuans model 162 that includes the features extracted from the input table 120 are also received along with the input table 120 by the answer receiver 502. The answer mapper 504 identifies the cells from the input table 120 from which the contents of the textual portion 152 are derived based on the features extracted by the TAQuans model 162. The identifiers of the cells of the input table 120 including the contents of the textual portion are provided to the tabular portion generator 506 which highlights the identified cells and captures an image of that portion of the input table 120 including the highlighted cells to provide the tabular portion 154 of the response 150.

Figure 6:
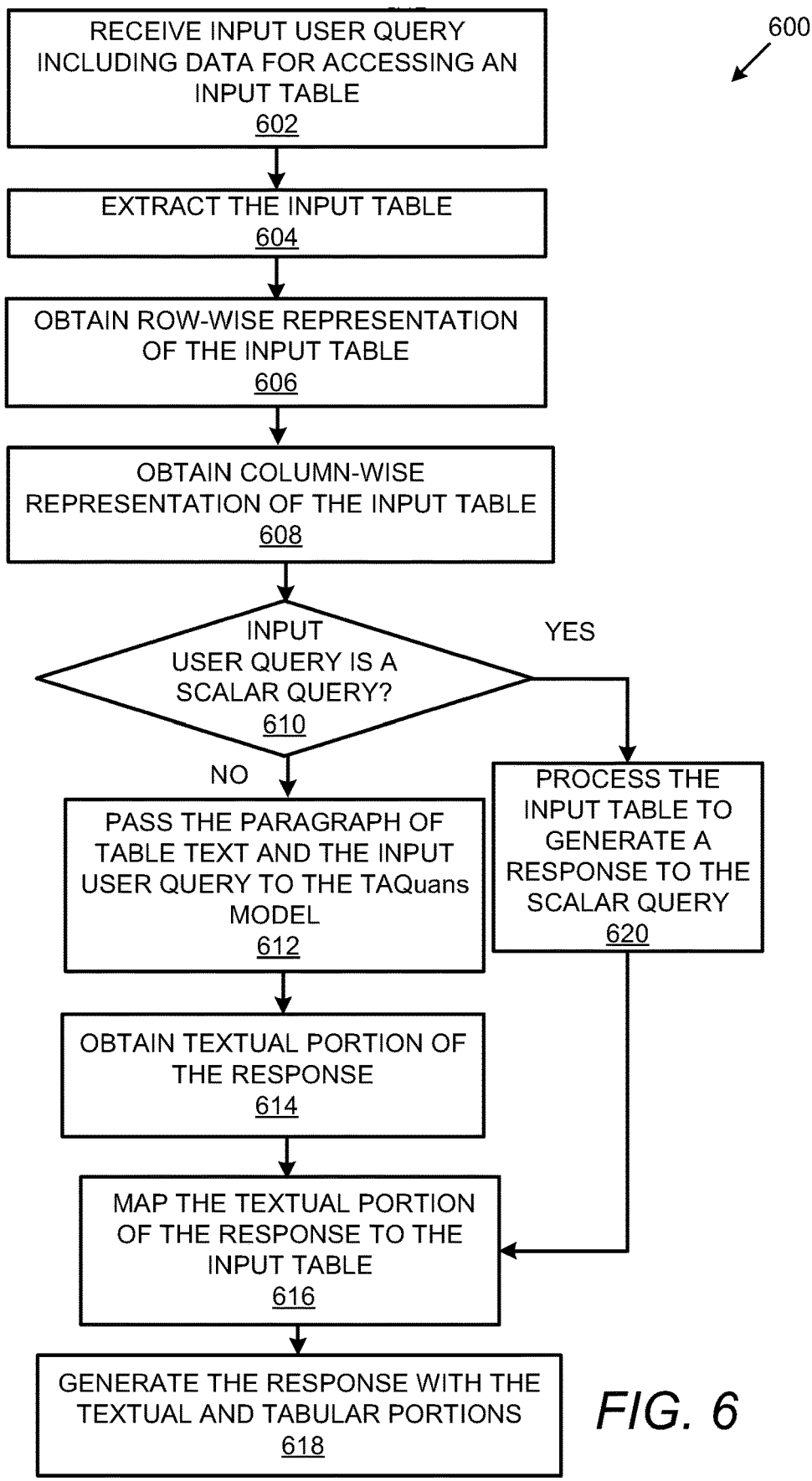
FIG. 6 shows a flowchart that details a method of automatically annotating images in accordance with examples disclosed herein.

FIG. 6 shows a flowchart 600 that details a method of automatically annotating images in accordance with examples disclosed herein. The method begins at 602 wherein the user request including the input user query 110 with identifying indicia that enable the question answering system 100 to access the input table 120 is received. In an example, a document with multiple tables can be provided with the input user query 110. The input user query 110 can be analyzed via text processing techniques to identify a matching table i.e., the input table 120 which will be further processed. The input table 120 with the relevant information is extracted at 604 based on the format of the document including the input table 120. At 606, the row-wise representation or a paragraph made up of row-level sentences is obtained. At 608, the column-wise representation or a paragraph of column-level sentences is obtained. The row-level representation is appended to the column-level representation to generate the paragraph of table text 142 at 608. At 610 it is further determined if the input user query 110 is a scalar query.

If it is determined at 610, that the input user query 110 is not a scalar query, then the paragraph of table text 142 is passed along with the input user query 110 to the TAQuans model 162 at 612. The TAQuans model 162 parses the input user query 110 and identifies the candidate answer or the textual portion 152 of the response 150 from the paragraph of table text 142 at 614. The portion of the input table 120 from which the candidate answer or the textual portion was derived is identified and mapped at 616. The identified portion or the mapping on the input table 120 are provided as the response 150 at 618 including the textual portion 152 and the tabular portion 154 via one or more of the output interfaces 114.

If it is determined at 610, that the input user query 110 is a scalar query, then the method moves to 620 wherein the processing of the input table 120 for generating a response to the scalar query is executed. It can be appreciated that there can be queries which are combinations of textual queries and scalar queries. Any query which requires a scalar or a mathematical operation will be classified as a scalar query at 610. Upon completing the processing for the scalar query, the method moves to 616 to map the portion of the input table 120 that provided the relevant information for the scalar query and to 618 generate the response 160 as described above.

Figure 7:
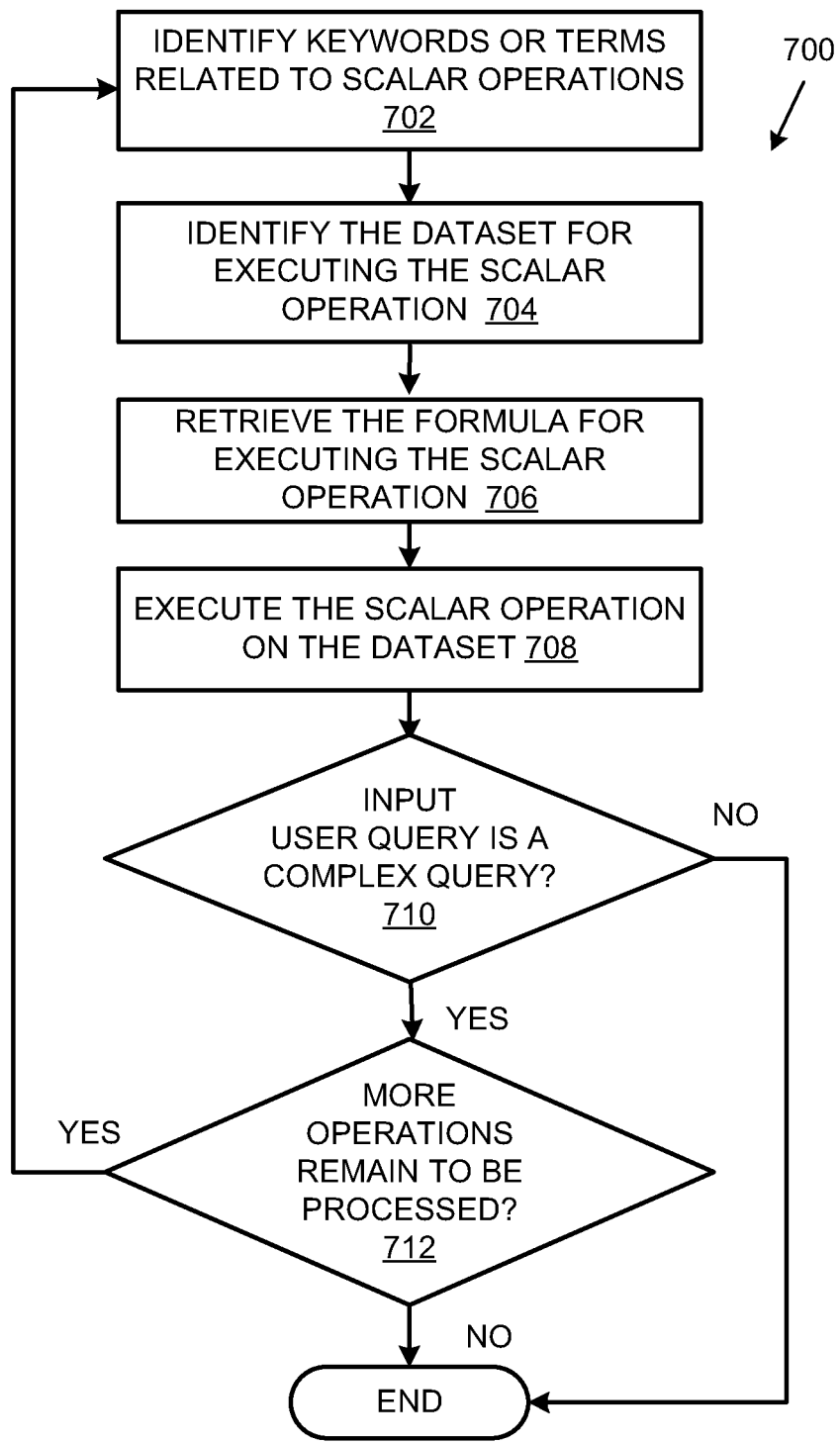
FIG. 7 shows a flowchart that details a method of processing a scalar query in accordance with the examples disclosed herein.

FIG. 7 shows a flowchart 700 that details a method of processing a scalar query in accordance with the examples disclosed herein. The method begins at 702 wherein the keywords or terms related to the scalar operation to be executed are identified. At 704, the dataset (e.g., one or more of columns and rows) on which the scalar operation is to be executed is identified. In an example, the features selected by the TAQuans model 162 from the table representation 144 based on the input user query 110 can be employed to identify the dataset. The mathematical formula for executing the scalar operation is retrieved from the collection 440 at 706 and the values from the dataset and substituted into the mathematical formula to execute the scalar operation on the dataset at 708. At 710, it is determined if the input user query 110 is a complex query that requires multiple scalar operations. For example, some queries may require multiple mathematical operations to be performed on the data set. Such examples may require the mathematical operations to be performed serially one after the other. The determination regarding complex queries can be based on the identification of multiple keywords or terms within the input user query 110. If it is determined at 710 that the input user query 110 is not a complex query the method may terminate on the end block. If, however, it is determined at 710 that the input user query 110 is a complex query the method proceeds to 712 to determine if further operations remain to be processed. If it is determined at 712 that further operations remain to be processed, the method returns to 702 to identify the next operation to be performed. It can be appreciated that complex queries can cascade the results so that the results from one or more prior operations are used in the subsequent operations. Accordingly, the data set selected at 704 may include data from the prior operations in the case of complex queries. In an example, the operations can be applied based on the order of precedence of the operations. If, however it is determined at 712 that no further operations remain to be processed, the method terminates on the end block.

Figure 8A:
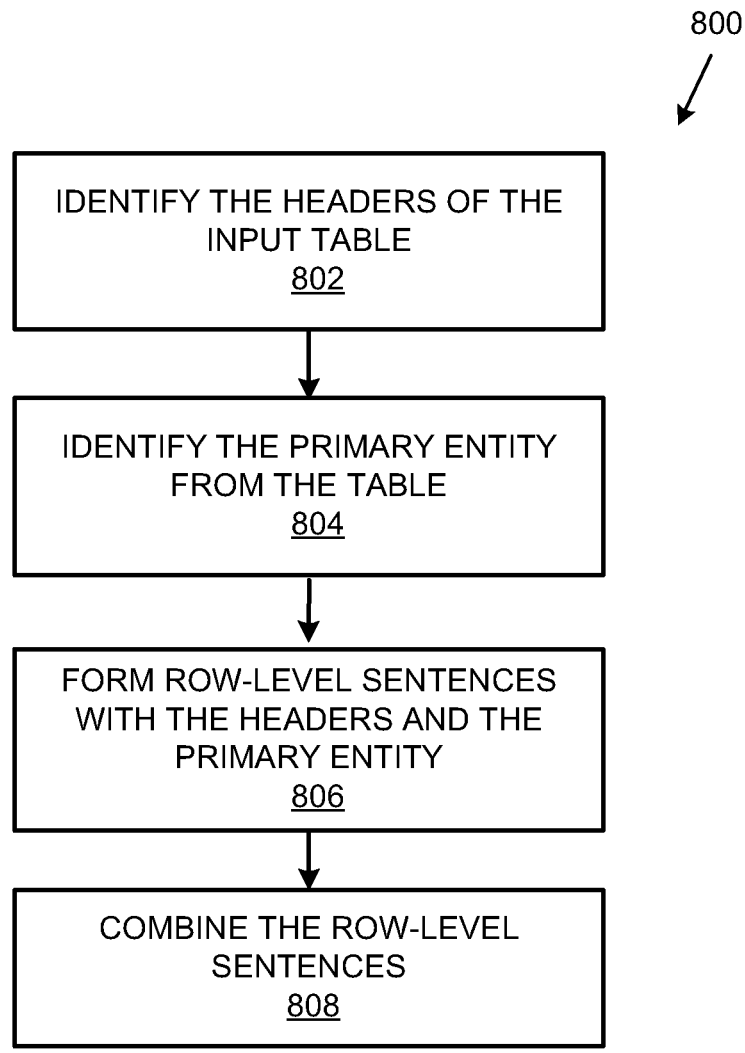
FIG. 8A shows a flowchart that details a method of generating a paragraph of row information in accordance with the examples disclosed herein.

FIG. 8A shows a flowchart 800 that details a method of generating a paragraph of row information in accordance with the examples disclosed herein. The method begins at 802 when the headers are identified from the input table 120. In an example, the contents of the cells in the topmost row can be identified as the headers of the table. At 804 the primary entity of the table is identified. In an example, the first column is treated as the primary entity established relations with the column data. At 806, for each row, the headers are combined with the primary entity to form the row-level sentence. An 808 the row-level sentences are combined to form a paragraph of row information.

Figure 8B:
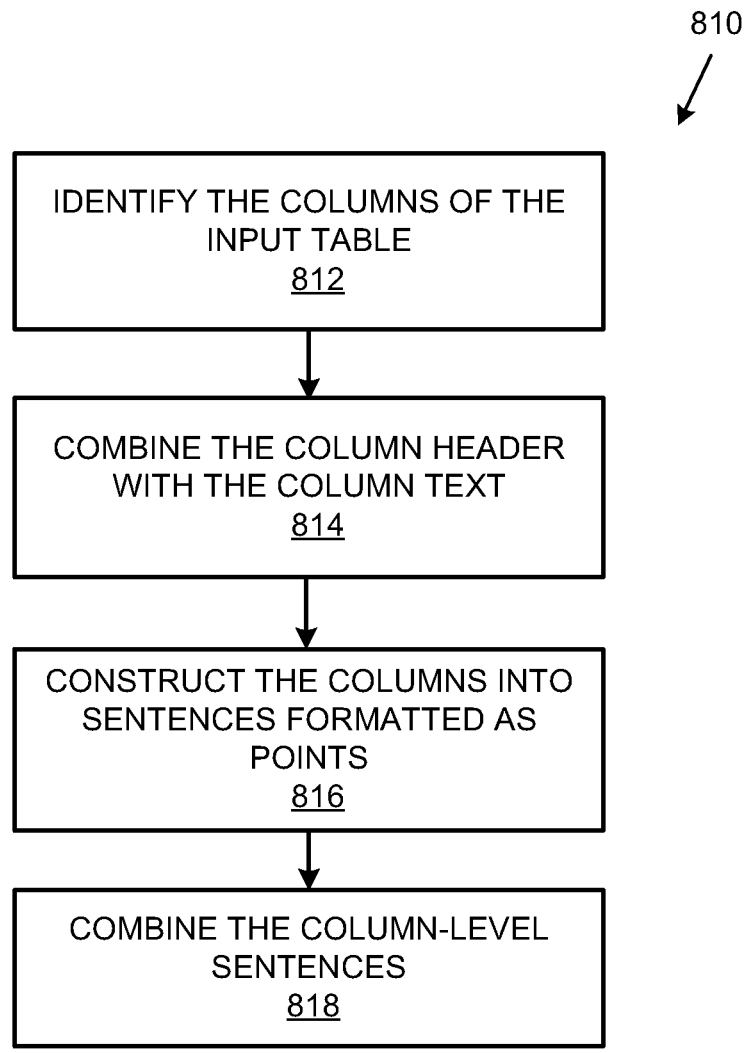
FIG. 8B shows a flowchart that is a method of generating a paragraph of column information in accordance with the examples disclosed herein.

FIG. 8B shows a flowchart 810 that is a method of generating a paragraph of column information in accordance with the examples disclosed herein. At 812, the columns of the input table 120 are identified. At 814, the column header of each of the columns is combined with the corresponding column text to form a column-level sentence. At 816, each column for the table is constructed into sentences formatted as bulleted points. At 818, the column-level sentences are combined to form a paragraph of column information.

FIG. 9 shows an example table 900 used to respond to user queries in accordance with the examples disclosed herein. In table 900, for each release, the details for the Milestone Due Date, Budget Allocation in dollars, Number of Resources, and the setup expenses in dollars are included. Below are some example scalar user queries and the answers or textual portions of the responses generated by the question answering system 100 to the user queries.

User Query 1: What is the total amount of budget allocation for the Project?

Answer: 48000

User Query 1 is a simple scalar query. To extract the total budget allocation, the aggregate function i.e., the sum is selected from the collection 440 for the dataset of the budget allocation.

User query 2: Which Milestone Name has the Highest Setup Expense?

Answer: January 2021 Release

User query 2 is a combination of a textual query and a scalar query. The user is asking for information on the milestone having the highest setup expense. The question answering system 100 must employ the scalar operation 'highest' on the column 'Setup Expense' and then check for the milestone name which will be the primary entity for identified row information. Thus, various combinations of textual manipulations and scalar operations can be required by different user queries.

Figure 10:
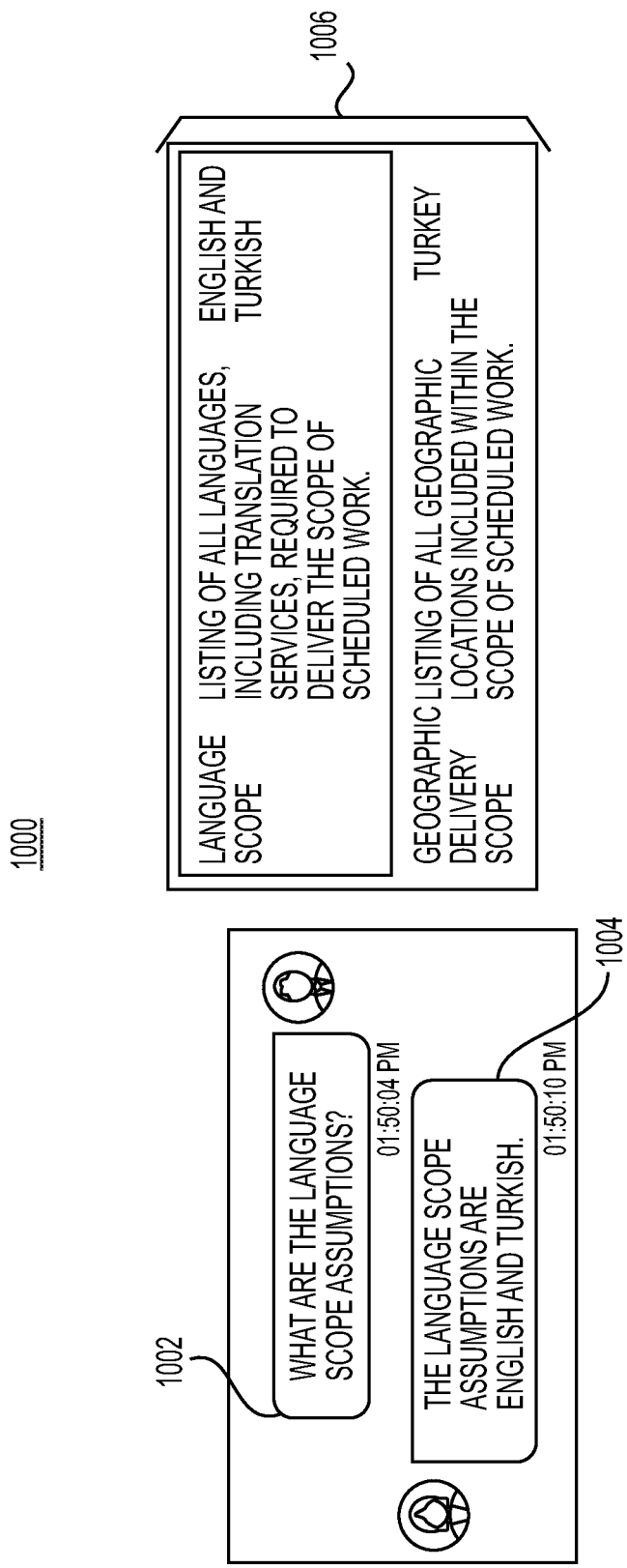
FIG. 10 shows an example chatbot interface with a user query and the response generated by the question answering system in accordance with the examples disclosed herein.

FIG. 10 shows an example chatbot interface 1000 with a user query 1002 and the response generated by the question answering system 100 in accordance with the examples disclosed herein. The response is shown on the chatbot interface 1000 and includes a textual portion 1004 regarding the language scope being English or Turkish the tabular portion with the highlighted portions 1006 of the table that includes the relevant information regarding the language scope and the geographic delivery scope.

Figure 11:
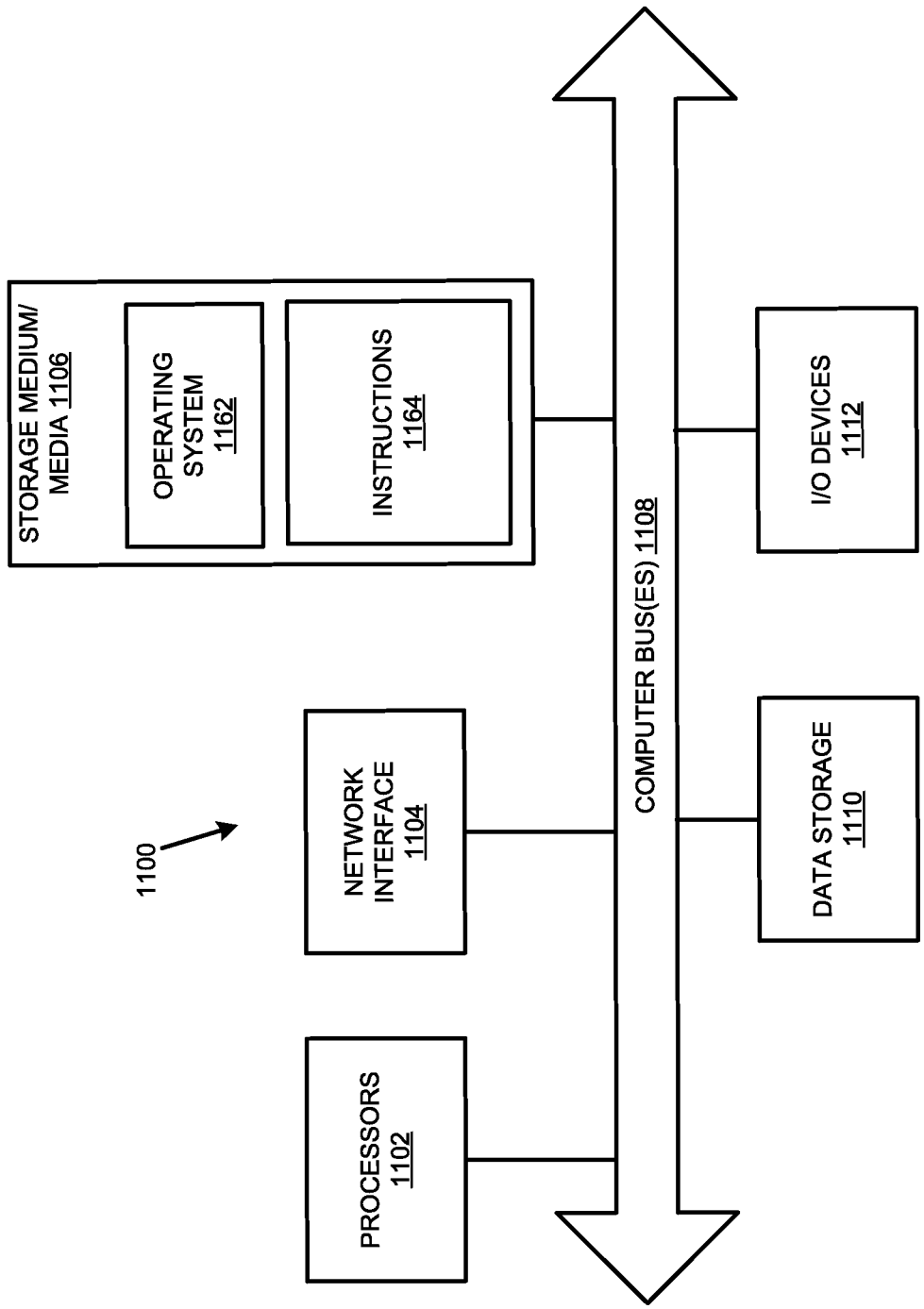
FIG. 11 illustrates a computer system that may be used to implement the intelligent table-based question answering system in accordance with the examples disclosed herein.

FIG. 11 illustrates a computer system 1100 that may be used to implement the intelligent question answering system 100. More particularly, computing machines such as desktops, laptops, smartphones, tablets, and wearables which may be used to generate or access the data from the intelligent question answering system 100 may have the structure of the computer system 1100. The computer system 1100 may include additional components not shown and that some of the process components described may be removed and/or modified. In another example, a computer system 1100 can sit on external-cloud platforms such as Amazon Web Services, AZURE® cloud or internal corporate cloud computing clusters, or organizational computing resources, etc.

The computer system 1100 includes processor(s) 1102, such as a central processing unit, ASIC or another type of processing circuit, input/output devices 1112, such as a display, mouse keyboard, etc., a network interface 1104, such as a Local Area Network (LAN), a wireless 802.11x LAN, a 3G, 4G or 5G mobile WAN or a WiMax WAN, and a processor-readable medium 1106. Each of these components may be operatively coupled to a bus 1108. The computer-readable medium 1106 may be any suitable medium that participates in providing instructions to the processor(s) 1102 for execution. For example, the processor-readable medium 1106 may be non-transitory or non-volatile medium, such as a magnetic disk or solid-state non-volatile memory or volatile medium such as RAM. The instructions or modules stored on the processor-readable medium 1106 may include machine-readable instructions 1164 executed by the processor(s) 1102 that cause the processor(s) 1102 to perform the methods and functions of the intelligent question answering system 100.

The intelligent question answering system 100 may be implemented as software stored on a non-transitory processor-readable medium and executed by the one or more processors 1102. For example, the processor-readable medium 1106 may store an operating system 1162, such as MAC OS, MS WINDOWS, UNIX, or LINUX, and code 1164 for the intelligent question answering system 100. The operating system 1162 may be multi-user, multiprocessing, multitasking, multithreading, real-time, and the like. For example, during runtime, the operating system 1162 is running and the code for the intelligent question answering system 100 is executed by the processor(s) 1102.

The computer system 1100 may include a data storage 1110, which may include non-volatile data storage. The data storage 1110 stores any data used by the intelligent question answering system 100. The data storage 1110 may be used to store the user queries, the paragraphs of table texts, the table representations, etc., and other data that is used or generated by the intelligent question answering system 100 during the course of operation.

The network interface 1104 connects the computer system 1100 to internal systems for example, via a LAN. Also, the network interface 1104 may connect the computer system 1100 to the Internet. For example, the computer system 1100 may connect to web browsers and other external applications and systems via the network interface 1104.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An intelligent question answering system, comprising:
at least one processor;
a non-transitory processor-readable medium storing machine-readable instructions that cause the processor to:
train a TAQuAns (table QuAns) model, based on bidirectional encoding using multi-layer transformer encoders, to respond to user queries regarding information in tables,
  wherein the TAQuAns model is trained on training data that includes sample user queries and representations of sample tables associated with the sample user queries,
  wherein each of the representations includes text generated from a corresponding one of the sample tables, in addition to row_position ids, column_position ids, and data features of cells of the corresponding sample table,
  wherein training the TAQuAns model based on the bidirectional encoding using the multi-layer transformer encoders comprises:
    training the multi-layer transformer encoders from an unlabeled text associated with the training data by conditioning on content in all layers of the multi-layer transformer encoders; and
    training the TAQuAns model by receiving output of the training of the multi-layer transformer encoders in a task-specific layer of the TAQuAns model, and
  wherein the TAQuAns model is trained jointly on both the sample user queries and the representations of the sample tables, to generate candidate answers from the tables based on the user queries;
access at least one input table based on data from an input user query that pertains to the at least one input table;
extract using one or more machine learning (ML) classifiers, row information regarding one or more rows and including one or more column headers from the at least one input table;
extract using the one or more ML classifiers, column information regarding one or more columns and including one or more row headers from the at least one input table;
identify contents of cells in a topmost row as column headers;
identify contents of cells in a leftmost column of the at least one input table as pertaining to a primary entity;
generate row-level sentences by combining the primary entity with each of the column headers;
generate column-level sentences by combining the column headers with contents of corresponding columns;
generate by natural language generation (NLG) tools, a paragraph of table text including meaningful sentences in a natural language by combining the row-level sentences and the column-level sentences;
provide the paragraph of table text including the meaningful sentences in the natural language and the input user query to the trained TAQuAns model;
parse, by the trained TAQuans model, the input user query to retrieve one or more candidate answers from the paragraph of table text;
obtain at least a portion of the paragraph of table text as a candidate answer of the one or more candidate answers to the input user query from the trained TAQuAns model based on the input user query;

provide the candidate answer as a textual portion of a response to the input user query via an output interface;
reverse map, by a reverse mapper, the candidate answer to cells of the at least one input table that include information used in the candidate answer, wherein reverse mapping the candidate answer comprises:
receiving the candidate answer from the trained TAQuAns model;
identifying relevant cells in the at least one input table based on the candidate answer received from the trained TAQuAns model, wherein content of the textual portion is derived from the identified cells; and
generating a tabular portion of the response by highlighting the identified cells within the at least one input table and capturing an image of a portion of the at least one input table that includes the highlighted cells; and
enable a display of the highlighted cells of the at least one input table reverse mapped to the textual portion as the tabular portion of the response via the output interface.

2. The question answering system of claim 1, wherein the processor is to further:
determine whether the input user query is a textual user query or a scalar user query, wherein the textual user query requires textual processing based on the paragraph of table text and the scalar user query requires execution of at least one predefined mathematical operation on contents of the input table.

3. The intelligent question answering system of claim 2, wherein to determine whether the input user query is the textual user query or the scalar user query, the processor is to further:
determine if the input user query includes one or more of numerical data types or mathematical keywords that signify that a mathematical operation is required.

4. The intelligent question answering system of claim 3, wherein if it is determined that the input user query is the scalar user query, the processor is to further:
identify a mathematical formula for the at least one predefined mathematical operation from a collection of predefined mathematical formulae and a dataset for executing the at least one predefined mathematical operation, wherein the dataset is identified from the paragraph of table text; and
execute the at least one predefined mathematical operation on the dataset.

5. The question answering system of claim 3, wherein if it is determined that the input user query is the scalar user query, the processor is to further:
determine if the scalar user query is a complex scalar user query that requires multiple mathematical operations;
identify a mathematical operation to be executed from the multiple mathematical operations, wherein a mathematical formula for the identified mathematical operation is selected from a collection of predefined mathematical formulae corresponding to different mathematical operations and a dataset for executing the identified mathematical operation, wherein the dataset is identified from the paragraph of table text;
execute the identified mathematical operation on the dataset;
select a next mathematical operation from the multiple mathematical operations, a mathematical formula for the next mathematical operation is selected from the collection of predefined mathematical formulae and a result of a prior mathematical operation;
execute the next mathematical operation; and
repeat the steps of identifying the next mathematical operation, executing the next mathematical operation until all the multiple mathematical operations are executed.

6. The intelligent question answering system of claim 1, wherein the TAQuAns model is based on Deep Quans which is a variation of Bidirectional Encoder Representations from Transformers (BERT).

7. The question answering system of claim 1, wherein to provide the response to the input user query the processor is to:
provide the textual portion of the response via a chatbot interface.

8. The intelligent question answering system of claim 1, wherein to form the paragraph of table text from the row information, the processor is to:
for each row:
combine the contents from the cells in the leftmost column with a corresponding one of the column headers to form the row-level sentences; and
combine the row-level sentences to form a paragraph of row information for the at least one input table.

9. The intelligent question answering system of claim 8, wherein to form the paragraph of table text from the column information, the processor is to:
for each column:
combine each of the column headers with the contents of cells in a corresponding column to form the column-level sentence;
combine the column-level sentences generated for the columns of the at least one input table to form a paragraph of column information; and
append the paragraph of row information to the paragraph of column information to form the paragraph of table text.

10. The intelligent question answering system of claim 8, wherein the processor is to:
process the at least one input table to generate a data representation of the at least one input table, wherein the data representation includes generated text that represents a natural language text derived from the at least one input table, row_position ids that represent mappings derived from an aggregation of positions spanning the generated text and the rows of the at least one input table, column_position ids that represent mappings derived from an aggregation of positions spanning the generated text and the columns of the at least one input table and data features which include contents of corresponding to the cells, rows or columns.

11. A method of answering user queries for tabular data, comprising:
training a TAQuAns (table QuAns) model, based on bidirectional encoding using multi-layer transformer encoders, to respond to user queries regarding information in tables,
wherein the TAQuAns model is trained on training data that includes sample user queries and representations of sample tables associated with the sample user queries,
wherein each of the representations includes text generated from a corresponding one of the sample tables, in addition to row_position ids, column_position ids, and data features of cells of the corresponding sample table, wherein training the TAQuAns model based on the bidirectional encoding using the multi-layer transformer encoders comprises:
training the multi-layer transformer encoders from an unlabeled text associated with the training data by conditioning on content in all layers of the multi-layer transformer encoders; and
training the TAQuAns model by receiving output of the training of the multi-layer transformer encoders in a task-specific layer of the TAQuAns model, and
wherein the TAQuAns model is trained jointly on both the sample user queries and the representations of the sample tables, to generate candidate answers from the tables based on the user queries;
accessing at least one input table using an input user query that pertains to the at least one input table;
extracting using one or more machine learning (ML) classifiers, row and column information from the at least one input table;
storing data from a first row of the at least one input table as corresponding column headers of the at least one input table;
storing data from a first column as pertaining to a primary entity that forms relationships with the column headers of the at least one input table;
generating, by natural language generation (NLG) tools, row-level sentences by combining the primary entity with each of the column headers;
generating, by the natural language generation (NLG) tools, column-level sentences by combining the column headers with contents of corresponding columns;
generating a paragraph of text by combining the row-level sentences and the column-level sentences, wherein the paragraph of text including meaningful sentences in a natural language corresponding to the at least one input table;
generating representation for the at least one input table, wherein the representation includes the paragraph of text including the meaningful sentences in a natural language, row_ids, column_ids, and data features extracted from the at least one table;
providing the input user query and the representation to the trained TAQuans model;
parsing, by the trained TAQuans model, the input user query to retrieve one or more candidate answers from the paragraph of table text;
obtaining, from the trained TAQuans model, a candidate answer of the one or more candidate answers to the input user query including one or more of the meaningful sentences from the paragraph of text;
generating a response to the input user query, wherein the response includes the candidate answer as a textual portion of the response;
reverse mapping, by a reverse mapper, the candidate answer to cells of the at least one input table that include information used in the candidate answer, wherein reverse mapping the candidate answer comprises:
receiving the candidate answer from the trained TAQuAns model;
identifying relevant cells in the at least one input table based on the candidate answer received from the trained TAQuAns model, wherein content of the textual portion is derived from the identified cells; and
generating a tabular portion of the response by highlighting the identified cells within the at least one input table and capturing an image of a portion of the at least one input table that includes the highlighted cells; and
enabling a display of the highlighted cells of the at least one input table reverse mapped to the textual portion as the tabular portion of the response via an output interface.

12. The method of claim 11, further comprising:
determining that the input user query is a scalar user query that requires at least one mathematical operation.

13. The method of claim 12, wherein the at least one mathematical operation includes one or more of a count, a sum and a mean.

14. The method of claim 11, wherein at least one input table includes a plurality of input tables and extracting the row and column information further comprises:
selecting, using keywords extracted from the input user query, a relevant input table from the plurality of input tables.

15. The method of claim 11, wherein the textual portion of the response includes one or more sentences, and the textual portion of the response is output via a voice interface.

16. A non-transitory processor-readable storage medium comprising machine-readable instructions that cause a processor to:
train a TAQuAns (table QuAns) model, based on bidirectional encoding using multi-layer transformer encoders, to respond to user queries regarding information in tables,
wherein the TAQuAns model is trained on training data that includes sample user queries and representations of sample tables associated with the sample user queries,
wherein each of the representations includes text generated from a corresponding one of the sample tables, in addition to row_position ids, column_position ids, and data features of cells of the corresponding sample table,
wherein training the TAQuAns model based on the bidirectional encoding using the multi-layer transformer encoders comprises:
training the multi-layer transformer encoders from an unlabeled text associated with the training data by conditioning on content in all layers of the multi-layer transformer encoders; and
training the TAQuAns model by receiving output of the training of the multi-layer transformer encoders in a task-specific layer of the TAQuAns model, and
wherein the TAQuAns model is trained jointly on both the sample user queries and the representations of the sample tables, to generate candidate answers from the tables based on the user queries;
access at least one input table using an input user query that pertains to the at least one input table;
extract using one or more machine learning (ML) classifiers, row information regarding one or more rows and including one or more column headers from the at least one input table;
extract using the one or more ML classifiers, column information regarding one or more columns and including one or more row headers from the at least one input table;
identify contents of cells in a topmost row as column headers;

identify contents of cells in a leftmost column of the at least one input table as pertaining to a primary entity;

generate row-level sentences by combining the primary entity with each of the column headers;

generate column-level sentences by combining the column headers with contents of corresponding columns;

generate by natural language generation (NLG) tools, a paragraph of table text by combining the row-level sentences and the column-level sentences;

provide the paragraph of table text and the input user query to the trained TAQuAns model;

parse, by the trained TAQuans model, the input user query to retrieve one or more candidate answers from the paragraph of table text;

obtain at least a portion of the paragraph of table text as a candidate answer of the one or more candidate answers to the input user query from the trained TAQuAns model based on the input user query; and provide the candidate answer as a textual portion of a response to the input user query via an output interface;

reverse map, by a reverse mapper, the candidate answer to cells of the at least one input table that include information used in the candidate answer, wherein reverse mapping the candidate answer comprises:

receiving the candidate answer from the trained TAQuAns model;

identifying relevant cells in the at least one input table based on the candidate answer received from the trained TAQuAns model, wherein content of the textual portion is derived from the identified cells; and generating a tabular portion of the response by highlighting the identified cells within the at least one input table and capturing an image of a portion of the at least one input table that includes the highlighted cells; and provide the highlighted cells of the at least one input table reverse mapped to the textual portion as the tabular portion of the response via the output interface.

17. The non-transitory processor-readable storage medium of claim 16, further comprising instructions that cause the processor to:

determine that the input user query is a scalar user query that requires a mathematical operation, wherein the mathematical operation includes one or more of a count, a sum, and a mean.

18. The intelligent question answering system of claim 1, wherein to provide the tabular portion of the response via the output interface the processor is to further:

enable highlighting the cells of the at least one input table reverse mapped to the textual portion; and provide the image of the portion of the at least one input table with the highlighted cells as the tabular portion of the response via the output interface.

* * * * *